Jan. 2, 1968   C. J. REYNOLDS   3,361,551
METHOD FOR MOLDING GLASS ARTICLES AND RELEASING
THE ARTICLES FROM THE MOLD
Filed Dec. 18, 1964   2 Sheets-Sheet 1

INVENTOR.
CLIFFORD J. REYNOLDS
BY Philip M. Rice
& W. A. Schaich
ATTORNEYS

United States Patent Office 3,361,551
Patented Jan. 2, 1968

3,361,551
METHOD FOR MOLDING GLASS ARTICLES AND RELEASING THE ARTICLES FROM THE MOLD
Clifford J. Reynolds, Columbus, Ohio, assignor to Owens-Illinois, Inc., a corporation of Ohio
Filed Dec. 18, 1964, Ser. No. 419,328
3 Claims. (Cl. 65—25)

This case relates generally to a method for molding bowl-shaped glass articles, and more particularly, to a method for releasing the newly-formed glass articles from the mold.

In the press molding of bowl-shaped glass articles, such as television face plates for example, molten glass is press formed between a cooperating mold and a plunger which are contoured to define a cavity corresponding to the configuration of the desired article. Such face plates normally include a viewing panel and an integrally formed annular flange or peripheral sidewall. Typically, a mold for forming television face plates includes a base portion having a molding surface conforming not only to the desired exterior contour of said viewing panel but extending at the periphery to include a portion of the peripheral sidewall or flange. During molding, the base portion is oriented so that the viewing panel exterior surface forms the lower or bottom surface of the newly-pressed article. By virtue of such orientation, the integrally formed peripheral sidewall or flange extends upwardly from the viewing panel during molding. Additionally, the mold includes a shell ring which rests upon the mold base portion and defines the exterior surface of the upper portion of the annular flange.

In practice, a gob of molten glass is dropped into the mold base portion and a plunger is introduced therein to press mold the molten glass into conformity with the cavity defined by the cooperating mold and plunger. The plunger and the ring shell are then removed and the molded article, upon cooling to achieve a partial set, is removed from the base portion. Such removal is impeded, however, because of the tendency of the newly-formed glass article to stick in the base portion. As is well known in the glass forming art, this sticking tendency is caused primarily by the fact that a nearly perfect vacuum is set up between the newly-formed article and the mold. Accordingly, it is necessary to forcefully release the article from intimate contact with the base portion molding surface.

Prior to the conception of the present invention such forceful release was effected by injecting a blast of pressured air through a passageway in the base portion at the radius between the viewing panel and the annular flange. This method of effecting the release of the newly-molded article was unsatisfactory for a number of reasons. In the first place, a relatively high pressure (on the order of 50 pounds per square inch line pressure) was required to effect such release with the result that the article would become warped. The pasageway forms a hole or break in the molding surface causing distortions in that area of the article surface. Additionally, the use of air directed through the corner vent or passageway achieved very inconsistent results in that there was a substantial variance in time between initiation of the air pressure and the actual release of the article from the mold base portion. Thus, in some cases the release would be effected immediately after initiation of the air pressure while in other cases the release would be delayed as much as fifteen seconds. Because of this inconsistency it was necessary to initiate the release air well in advance of the take-out station to insure that the article was actually released from the mold by the time it reached the take-out station. Such advance initiation of the released air required either that the newly-formed article be subjected to pressure before it had fully set with the result that warpage was excessive or that the molding cycle be lengthened with the result that output, and thus operating efficiency, was reduced. Furthermore, the passageway or vent had a tendency to warp or become cracked with the result that mold repairs were frequently required.

In order to minimize the warpage which prevailed prior to the conception of the present invention, it was necessary to maintain the molds at a relatively low temperature (800–850° F.) at the time of dropping molten glass therein to thereby maximize the rate of heat removal from the newly-formed article. The utilization of such relatively cool molds, while necessary to hold warpage within tolerable limits, is undesirable in that surface defects (checking) are frequently encountered.

Through the adoption of the present invention, it is possible to operate the molds at a sufficiently high temperature (850–900° F.) to insure the forming of articles having superior surface characteristics and yet conforming closely to the desired contour.

Under the present invention, the article is consistently released from the mold shortly after the initiation of the release air, the variance in time of release for the article being within five seconds. As a result, the newly-molded articles are permitted to remain in intimate contact with the molding surface for the longest possible time, substantially longer than was heretofore possible, without disrupting or slowing down the production cycle. By virtue of the increased time in the mold, the articles are permitted to become more firmly set before being subjected to external pressures required for release from the mold..

Accordingly, it is an object of the present invention to provide a method for press molding bowl-shaped glass articles.

It is another object of the present invention to provide a method for releasing newly-molded articles from a forming mold.

It is an additional object of the present invention to provide a method of effecting release of a newly-molded article from a mold without excessively warping such article.

It is a further object of the present invention to provide an efficient method of forming glass articles conforming closely to a desired contour.

Other objects and advantages of the present invention will become readily apparent from the following detailed description taken in conjunction with the annexed sheets of drawings on which:

Figure 1:
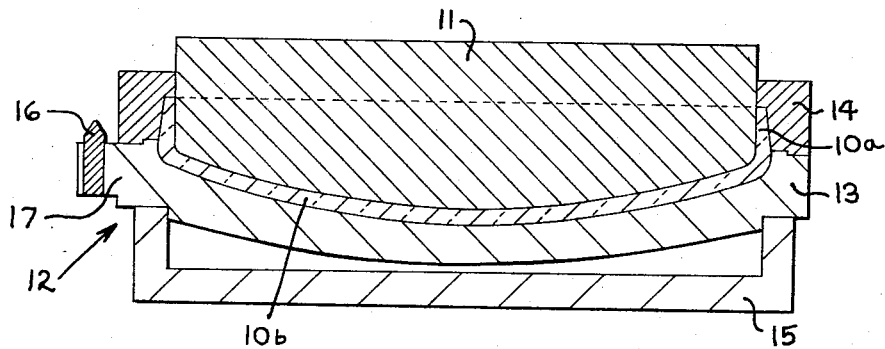
FIGURE 1 is a vertical sectional view of a mold and plunger mechanism used in forming television face plates.

In brief, the present invention comprises molding the glass article, permitting the article to cool and thus become set and then directing low pressured fluid substantially uniformly about the periphery of the flange or sidewall at the juncture of said sidewall and the adjacent molding surface to thereby release the article from the mold.

While the present invention will be described as specifically applicable to the manufacture of a cathode-ray tube part, it will be apparent to those skilled in the art that the principles of the invention are equally applicable to the manufacture of any type of bowl-shaped glass article or part molded by press forming a molten charge of glass to the desired configuration. The bowl-shaped article is generally one having a continuous rim or flange portion extending transversely around its central panel portion.

Under the present invention, a glass article 10 is molded in a press comprised of a vertically operable plunger 11 and a cooperating mold generally designated by the numeral 12. The plunger 11 and the mold 12, when operably positioned, cooperate to define a molding cavity corresponding to the shape of the desired article 10. The bowl-shaped article 10 has a continuous flange or peripheral sidewall portion 10a extending transversely around its central panel or bottom portion 10b. The mold 12 includes a base portion 13 and a shell ring portion 14. The base portion 13 is contoured to the desired external configuration of the central panel or bottom portion 10b and the lower or immediately adjacent portion of the flange 10a. The shell ring 14 has a molding surface corresponding to the desired external configuration of the upper portion of the flange 10a. The base portion 13 rests upon a supporting plate 15 and has a plurality of three indexing pins 16 equally spaced about the periphery of said base portion and supported on radially outwardly extending flanges 17. The shell ring 14 is capable of independent movement and separation from the base portion 13 to facilitate removal of the pressed article from said base portion.

Figure 2:
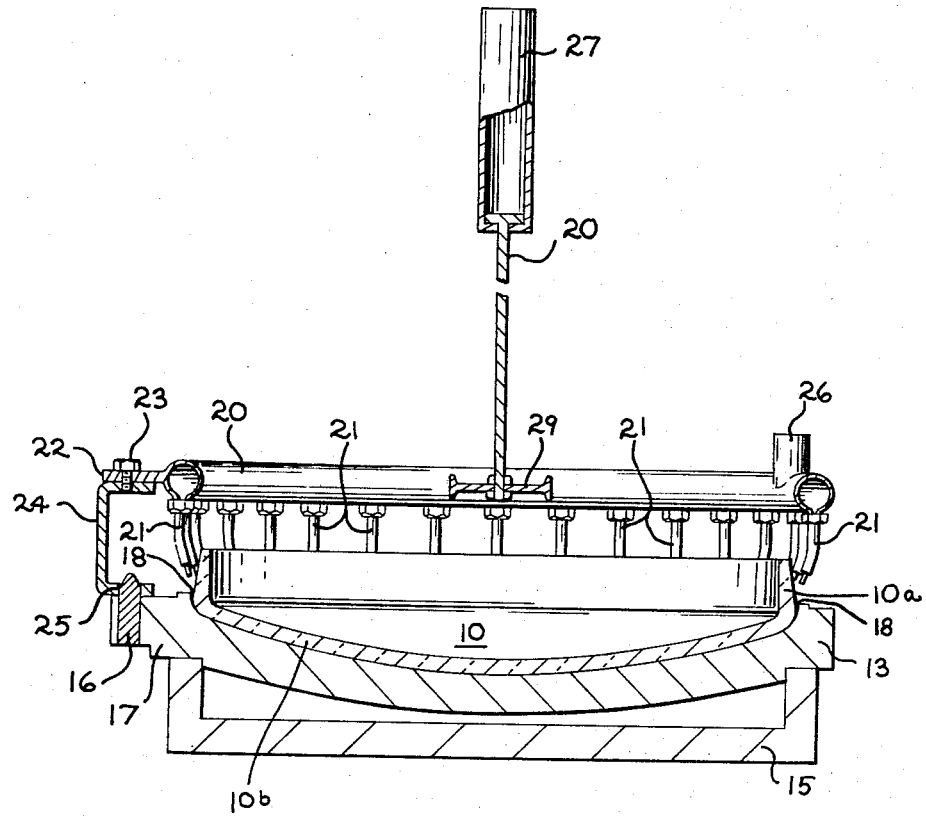
FIGURE 2 is a sectional view showing a newly-formed face plate in a mold base portion after removal of the plunger and shell ring and mechanism for directing low pressured air between the newly-formed glass exterior surface and the mold.
Figure 3:
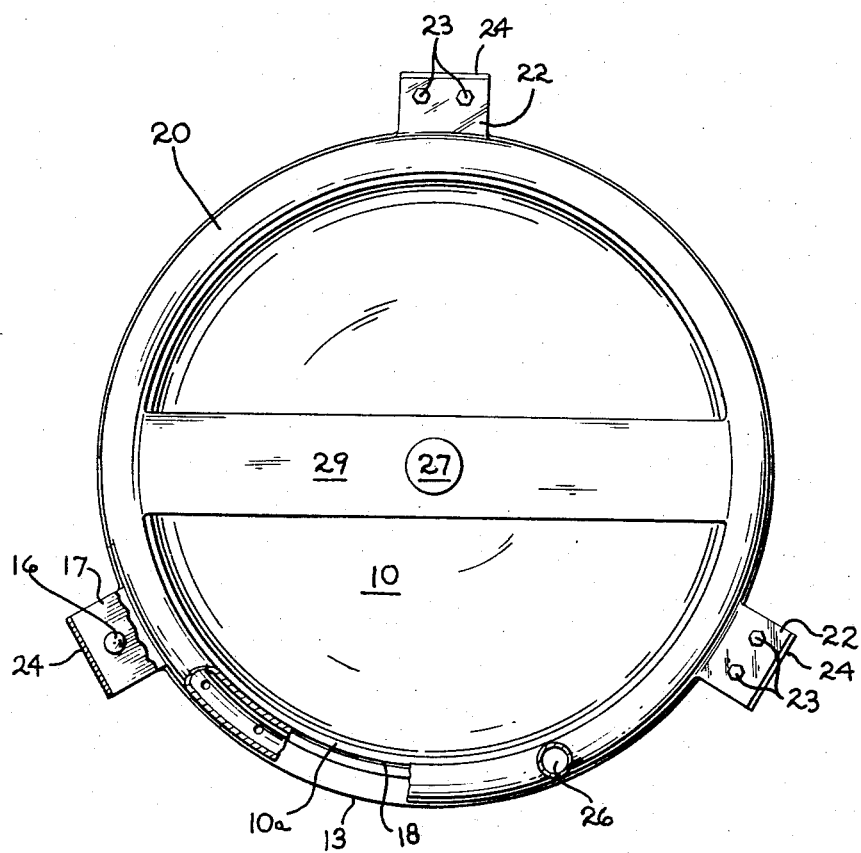
FIGURE 3 is a top plan view of the apparatus shown in FIGURE 2.

As is well known in the art of press molding articles, a gob of molten glass is dropped or otherwise positioned on the assembled mold (base portion 13 and shell ring portion 14). The plunger 11 is then moved vertically downwardly by any preferred power means (not shown) to mold the molten glass into conformity with the cavity lying between said plunger and said mold. The plunger 11 is then removed from the mold 12. Thereafter, the shell ring portion 14 is removed. For a period of time subsequent to removal of the plunger 11 and shell ring portion 14, the newly-pressed article 10 is permitted to remain in the base portion 13 while cooling to impart a set to the glass. For most glass compositions, there is a tendency for the newly-pressed article 10 to pull away slightly upon cooling thereby forming a small space 18 (FIGURE 2) between the upper edge of the mold base portion 13 and the adjacent portion of the pressed article 10. After cooling and achieving a partial set, the pressed article 10 is then ready for removal from the base portion 13 of the mold.

In order to achieve the greatest operating efficiency from the molding equipment, it is desirable to remove the pressed article 10 from the mold base portion 13 at the earliest possible time. In practice, the article is removed from the base portion 13 before it is fully set to a fixed or permanent contour. As a result of this relatively early removal of the article to permit the greatest operating efficiencies, it is highly desirable that it not be subjected to any concentrated or unequalized forces as such forces tend to warp or distort the article. Because of the fact that the newly-formed pressed article 10 is held rather securely in the mold base portion 13, external forces must be utilized to effect the release of the article from the base portion 13. The release according to the present invention is effected by directing low pressured air (two to ten pounds per square inch line pressure) substantially uniformly about the external periphery of the pressed article flange 10b at the juncture of such flange and the top of the base portion 13.

To effect such application of pressured air, there is provided an annular manifold 20 having a plurality of closely spaced nozzles 21 extending downwardly therefrom which, when the manifold is positioned on the base portion 13, are directed to the juncture between the exterior surface of the pressed article flange 10a and the top of the base portion 13. If the glass used in forming the pressed article 10 is of the type which pulls away from the mold upon cooling to form a space 18 between the flange exterior surface and the top of the base portion 13, the nozzles 21 are directed into said space.

The manifold 20 has secured thereto a plurality of three radially-extending plates 22 which are aligned with the indexing pins 16 of the mold base portion 13. Secured to the plates 22, as by bolts 23, is a U-shaped channel member 24 the lower leg of which has an aperture 25 adapted to receive the indexing pin 16. The U-shaped channel member 24 and the nozzles 21 are sized so that the nozzles are approximately one-half to one inch from the juncture of the flange 10a and the mold base portion 13. By virtue of the indexing feature, the nozzles are consistently positioned on mold base portion 13 in the above relationship to the article 10 and base portion 13. Low pressured air is directed to the manifold from a supply line 26. The manifold 20 is vertically operable from a raised to a lowered position by means of a fluid cylinder 27 having a piston 28 extending therefrom. The piston 28 is secured to a supporting member 29 which is welded to the manifold 20.

In operation, the mold base portion 13 containing the newly-pressed article 10 is moved under the cylinder 27 carrying the manifold 20 and its indexing channel member 24. The cylinder 27 is then actuated to lower the manifold until the U-shaped channel member 24 comes to rest on the base portion outwardly extending flange 17 with the indexing pins 16 inserted in the apertures 25. Low pressured fluid is directed into the manifold 20 from the supply line 26 and from the manifold to nozzles 21 which direct jets of the low pressured air substantially uniformly about the periphery of the pressed article flange 10b to thereby effect the release of the article 10 from the mold base portion 13. The application of such uniform pressure actually lifts the article 10 out of the mold base portion 13 and floats it on a cushion of air. The article thus released from the base portion 13 is substantially uniform throughout and has no warped portions as was true of those released by the methods utilized prior to the adoption of the present invention. The article 10 is then ready for removal from the base portion 13.

It can be seen from the foregoing that the present invention provides a method of forming and, more particularly, a method of releasing molded articles in a manner which promotes the greatest efficiency from the standpoint of rapid cycling and yet provides articles having precisely defined contours with a minimum of warping. Additionally, incorporation of the present invention permits the molds to be maintained at higher temperatures than was previously possible, thus permitting the forming of the glass articles having superior surface characteristics.

Various modifications may be resorted to within the spirit and scope of the appended claims.

I claim:

1. In the method of molding hollow glass articles of the type having a bottom panel and an upwardly extending annular flange depending therefrom wherein a gob of molten glass is dropped in a mold and a plunger is introduced therein to press mold the molten glass into conformity with the cavity defined by a cooperating mold and plunger, said mold including a base portion having a molding surface conforming to the desired exterior contour of the bottom panel and a portion of said annular flange and a ring shell portion having a molding surface conforming to the desired exterior contour of the upper portion of said annular flange, the improvement comprising the steps of removing the plunger and the ring shell portion of said mold out of contact with the article leaving its upper flange portion extending upwardly from said base portion, permitting the upstanding flange to pull inwardly to form a space between said flange lower portion and said mold base portion, and directing a flow of pressurized gaseous fluid into said space substantially uniformly about said flange.

2. In the method of molding hollow glass articles of the type having a bottom panel and an upwardly extending annular flange depending therefrom wherein a gob of molten glass is dropped in a mold and a plunger is introduced therein to press mold the molten glass into conformity with the cavity defined by a cooperating mold and plunger, said mold including a base portion having a molding surface conforming to the desired exterior contour of the bottom panel and a portion of said annular flange and a ring shell portion having a molding surface conforming to the desired exterior contour of the upper portion of said annular flange, the improvement comprising the steps of removing the plunger and the ring shell portion of said mold out of contact with the article leaving its annular flange portion freely upstanding, permitting the annular flange to pull inwardly to form a space between said flange lower portion and said mold base portion, and directing a flow of pressurized fluid into said space substantially uniformly about said flange prior to the setting of said article to a fixed contour.

3. In the method of molding hollow glass articles of the type having a bottom panel and an upwardly extending annular flange depending therefrom wherein a gob of molten glass is dropped in a mold and a plunger is introduced therein to press mold the molten glass into conformity with the cavity defined by a cooperating mold and plunger, said mold including a base portion having a molding surface conforming to the desired exterior contour of the bottom panel and a portion of said annular flange and a ring shell portion having a molding surface conforming to the desired exterior contour of the upper portion of said annular flange, the improvement comprising the steps of removing said ring shell portion and directing a flow of pressurized gaseous fluid substantially uniformly about said upstanding annular flange toward the juncture of said flange and said mold base portion prior to the setting of said article to a fixed contour.

References Cited

UNITED STATES PATENTS 2,314,812   3/1943   Blau et al. _____ 65—17
3,264,080   8/1966   Mayhew et al. _____ 65—83 X DONALL H. SYLVESTER, *Primary Examiner.*

A. D. KELLOGG, *Assistant Examiner.*